United States Patent [19]
Kakuma et al.

[11] Patent Number: 5,488,606
[45] Date of Patent: Jan. 30, 1996

[54] PROCEDURE FOR SWITCHING-OVER SYSTEMS

[75] Inventors: Satoshi Kakuma; Shuji Yoshimura; Kazuo Hajikano; Masami Murayama; Yuzo Okuyama, all of Kanagawa, Japan

[73] Assignee: Fujitsu Limited, Kanagawa, Japan

[21] Appl. No.: 216,149

[22] Filed: Mar. 21, 1994

[30] Foreign Application Priority Data

Sep. 20, 1993 [JP] Japan .................... 5-233460

[51] Int. Cl.$^6$ .................................... H04L 12/56
[52] U.S. Cl. ............................ 370/16; 370/60.1
[58] Field of Search .................... 370/16, 60, 60.1, 370/94.1, 94.2; 340/827, 825.01, 825.03; 371/8.1, 8.2, 11.1, 11.2

[56] References Cited

U.S. PATENT DOCUMENTS

| | | | |
|---|---|---|---|
| 5,072,440 | 12/1991 | Isono et al. | 370/16 |
| 5,274,633 | 12/1993 | Kato et al. | 370/16 |
| 5,283,782 | 2/1994 | Takase et al. | 370/60 |
| 5,301,184 | 4/1994 | Uriu et al. | 370/60.1 |

*Primary Examiner*—Hassan Kizou

[57] ABSTRACT

An ATM (asynchronous transfer mode) exchange has a buffer for system #0 and a buffer for system #1 providing P-MEM's for storing data including an A bit and for a VCI/VPI currently in use is set to "1". Upon detecting a switchover between the systems, every B bit is reset to "0". When the exchange while changing from a master to a slave receives a cell having a slave indication and while changing from a slave to a master it receives a cell having a master indication, respective systems rewrite B bits for VCI/VPI's of respective cells to "1". In the meantime, each of the P-MEM's calculates exclusive "OR" operations between the A bit and the B bit for every VCI/VPI, and further obtains a disjunction among all the exclusive "OR" operations thus obtained. Then, when both P-MEM's obtain "0" for their respective disjunctions, cells are read out from one of the buffers in the system changing from a slave to a master. This enables the ATM exchange having a switch duplexed by mutually asynchronous active and backup systems to switchover the systems without causing a cell to be duplicated or lost.

4 Claims, 13 Drawing Sheets

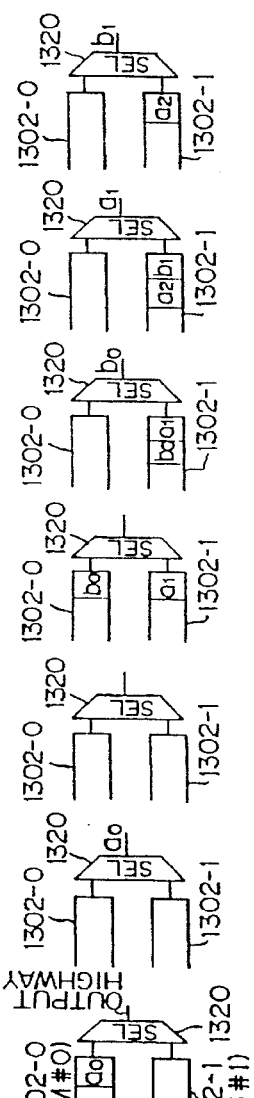

PROCEDURE FOR SWITCHING-OVER SYSTEMS

BACKGROUND OF THE INVENTION

1. Field of the Invention

This invention pertains to a procedure for switching-over systems for use in a duplexed ATM exchange operating in an asynchronous transfer mode (hereafter referred to as an ATM exchange).

2. Description of the Related Arts

Research and development has been actively conducted for realizing B-ISDN (Broadband aspects of Integrated Services Digital Network) for providing high-speed broadband communications such as full-fledged video image communications, transmissions of video signals of high-definition televisions and transfers of large files.

ATM (Asynchronous Transfer Mode) is a transmission/exchange mode forming a nucleus of the B-ISDN. Under ATM, a fixed length data column having fifty-three [53] bytes (octets) called an ATM cell is a unit of multiplexing and exchange. An ATM exchange network builds itself upon two [2] stages called a virtual channel (VC) and a virtual path (VP).

A VC, corresponding to a line, is a minimum unit of a logical connection the routing of which an ATM network processes. A VP, corresponding to a digital path, is a large bound of logical connections whose routing an ATM network processes, and is a multiplexed value of VCs. Therefore, a single VP connection must have at least one [1] VC connection.

An ATM exchange is an exchange for repeating and exchanging the ATM cells in an ATM network. When used as an LS (Local Switch: a subscriber line exchange) in an STM (synchronous transfer mode) network, it is connected to a subscriber line. An ATM exchange selects an individual VC connection by a VCI (Virtual Channel Identifier) stored in the header of such an ATM cell, and exchanges/repeats the ATM cell based on the value of its VCI. And a VP connection is identified by a VPI (Virtual Path Identifier) also stored in the header of such an ATM cell. In other words, an ATM network has a VPI and VCI to identify a particular cell between unique locations.

Incidentally, an ATM network specifically calls an ATM exchange forming a VP network an ATM cross-connect. The ATM cross-connect processes VC connections transparently. The values of VPI and VCI are determined when an ATM connection is established, and are retained until the ATM connection is released. The establishment and release of an ATM connection uses a signaling procedure, for example. A virtual channel connection different than one for user data called a signaling virtual channel carries the signaling data necessary then.

An ATM exchange has an internal switching unit called an ATM switch to process a routing. Hardware processes the routing control by referring to a tag attached to the head end of a header of an ATM cell (hereafter referred to simply as a cell).

Incidentally, the ATM exchange needs to duplex its switching units for improving its reliability. However, when an ATM network forms a duplex structure comprising an active (master) system and a backup (slave) system, because these two [2] systems are not synchronized, a cell transmission timing difference arises between these two [2] systems. Accordingly, when the systems are simply switched over during a maintenance or an operation, a cell may be duplicated or lost. That is, when the active system has a smaller transmission delay than the backup system, a simple system switchover causes a cell to be duplicated. Alternatively, when the active system has a larger transmission delay than the backup system, a simple system switchover causes a cell to be lost. Even though a synchronization of these two [2] systems will prevent cells from being duplicated or lost, this destroys the merit of an ATM network.

SUMMARY OF THE INVENTION

This invention aims at enabling an ATM exchange having switching units duplexed with mutually asynchronous active and backup systems to switch over their operating modes without causing a cell to be duplicated or lost.

This invention is premised on a procedure for switching-over systems for use by an asynchronous transfer mode exchange duplexed with systems #0 and #1.

The redundant ATM exchange of the present invention comprises:

a switching unit for system #0;

a switching unit for system #1;

a cell transmission means, for assigning a mark designating either of a master indication and a slave indication to a cell incoming from an input highway, and for transmitting a cell having a master indication to a switching unit operating as a master and a cell having a slave indication to a switching unit operating as a slave, the cell transmission unit provided in correspondence with each input highway; and a cell reception unit, for receiving, for an output to an output highway, a cell supplied from the switching unit for system #0 and another supplied from the switching unit for system #1, and for changing, upon a system switchover, an outgoing cell to the output highway, based on the mark assigned to the cell, from a cell supplied from the switching unit of the system operating as an old master, to a cell supplied from the switching unit of the system operating as a new master, the cell reception unit provided in correspondence with each output highway.

BRIEF DESCRIPTION OF THE DRAWINGS

One of ordinary skill in the art can easily understand additional features and objectives of this invention from some of the attached drawings. In the drawings:

FIG. 5b is a diagram showing the circuit configuration of a DMUX unit of the MDX;

FIGS. 13A to 13H are diagrams explaining the operation of the ACT SEL.

DESCRIPTION OF THE PREFERRED EMBODIMENT

This invention is premised on a procedure for switching-over systems for use by an asynchronous transfer mode exchange duplexed with systems #0 and #1.

Figure 1:
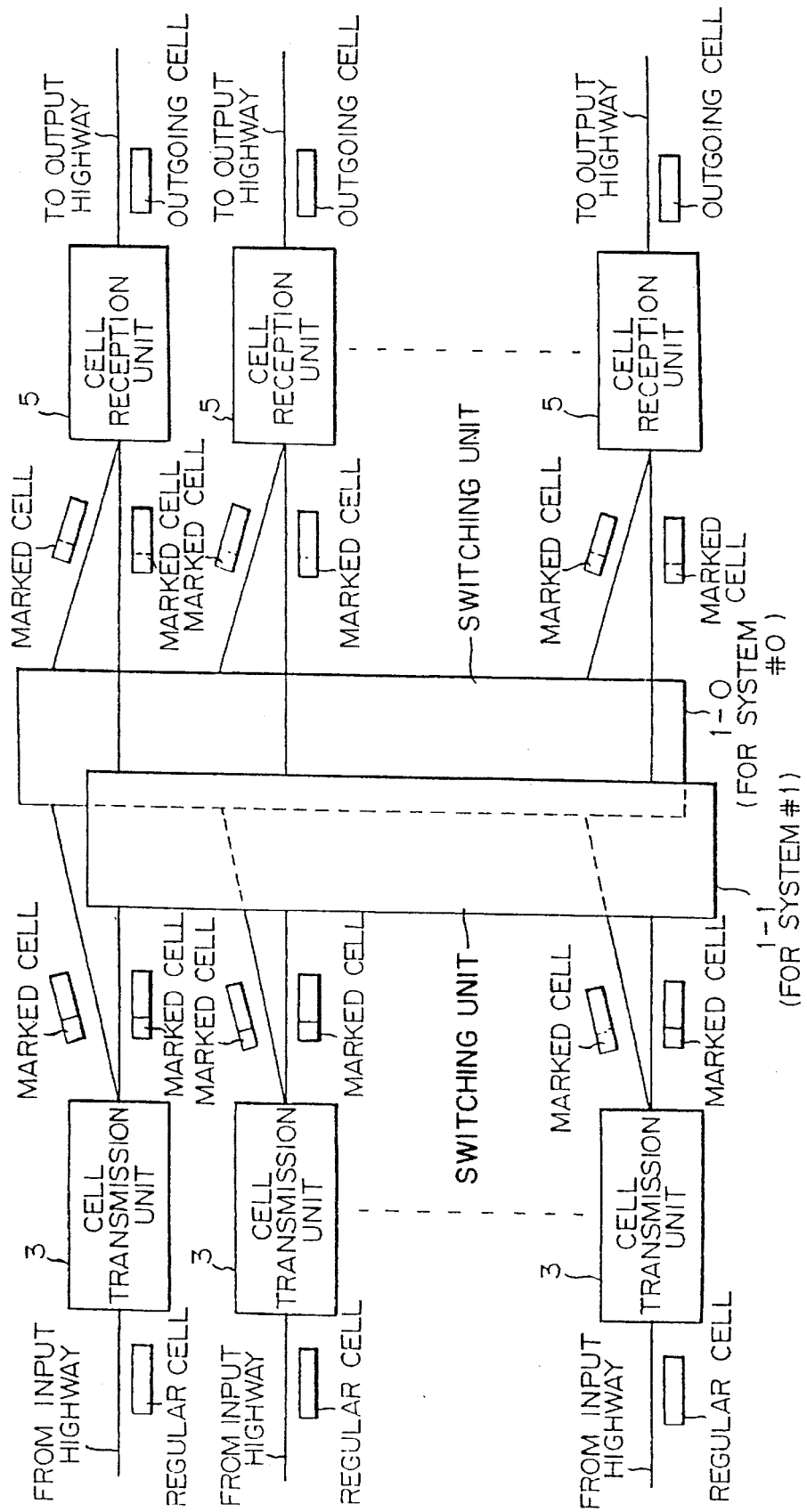
FIG. 1 is a block diagram of the ATM exchange of the present invention.

In FIG. 1, a switching unit 1-0 for a system #0 and a switching unit 1-1 for a system #1 are switching modules capable of routing cells.

A cell transmission unit 3 assigns a mark designating a master indication or a slave indication to a cell incoming from an input highway (a subscriber line or a transmission line), and transmits a cell having a master indication to a switching unit 1-i (i=0,1) operating as a master and a cell having a slave indication to a switching unit 1-j (j=0,1; j≠i) operating as a slave. A cell transmission unit 3 is provided in correspondence with each input highway. The mark is set in a tag attached to a header of a cell the routing of which each of the switching units 1-0 and 1-1 processes.

A cell reception unit 5 receives, for an output to an output highway (a subscriber line or a transmission line), a cell supplied from switching unit 1-0 for system #0 and another supplied from switching unit 1-1 for system #1, and changes, upon a system switchover, an outgoing cell to the output highway, based on the mark assigned to the cell, from a cell supplied from the switching unit 1-i (i=0,1) of the system operating as an old master, to a cell supplied from the switching unit 1-j (j=0,1; j≠i) of the system operating as a new master. A cell reception unit 5 is provided in correspondence with each output highway.

A cell reception unit 5 includes, in correspondence with each system, a buffer for storing a cell having a master indication, and a detector unit for detecting, upon a system switchover, the mark designation of a cell transmitted from a cell transmission unit 3 has changed in conformity with the system switchover, for each path currently set; and further comprises a switching-over unit for switching-over a buffer wherefrom a cell having the master indication is read with a buffer of the system operating as a new master, pursuant to a detection result of the detector unit of each system.

A detector unit may comprise a storage unit for storing data on either of the presence and absence of a path currently set for each logical channel identified by a virtual channel identifier and a virtual path identifier; such that it detects, upon the system switchover, the mark designation of the cell transmitted from a cell transmission unit 3 has changed, for each path currently set, based on the data stored in the storage unit.

The storage unit may comprise a storage area for use in storing the data on either of the presence and absence of a path currently set, and a work area for use in detecting that the mark designation assigned to a transmitted cell has changed, provided, on a one-for-one basis, in correspondence with the storage area for use in storing data on a path currently set.

With the above configuration, each of switching unit 1-0 for system #0 and switching unit 1-1 for system #1 may output a notification signal informing each of the cell reception unit 5 of the current operating mode of itself; such that each of the cell reception unit 5 detects a system switchover by detecting a change in the input level of the notification signal.

A cell transmission unit 3 provided in correspondence with an input highway, such as a subscriber line and a transmission line, receives a cell incoming from the input highway. Each cell transmission unit 3 assigns a mark designating a master indication or a slave indication to such an incoming cell, and transmits one with a master indication to a switching unit 1-i (i=0,1) currently operating as a master and one with a slave indication to a switching unit 1-j (j=0,1, j≠i) currently operating as a slave.

Each of switching units 1-0 for system #0 and switching units 1-1 for system #1 routes an incoming cell pursuant to its routing data, thereby outputting it to an appropriate cell reception unit 5.

A cell reception unit 5 selects a cell having a master indication outputted from switching unit 1-i (i=0,1) operating as a master during a normal operation, thereby outputting it to an appropriate output highway. Upon a system switchover, a cell reception unit 5 detects that a cell supplied from switching unit 1-i (i=0,1) of an old master switched over from a master to a slave and a cell supplied from switching unit 1-j (j=0,1; i≠j) of a new master switched over from a slave to a master have changed their mark designations in conformity with the system switchover, and stores internally a cell having a master indication supplied from switching unit 1-j operating as the new master, thereby holding an output of such a stored cell having a master indication to an output highway. Meanwhile, it keeps outputting to an appropriate output highway a cell having a master indication supplied from the switching unit 1-i operating as the old master. Upon detecting a timing at which a cell is neither duplicated nor lost, it begins outputting to an output highway such a stored cell having a master indication supplied from the switching unit 1-j operating as the new master.

Thus, the supervision by a cell reception unit 5 of a change in the mark designation of an outgoing cell to an output highway supplied from switching unit 1-0 for system #0 and switching unit 1-1 for system #1, upon a system switchover, enables an incoming cell on every path of a call to be switched from an old master to a new master, at a timing when no cell is duplicated or lost (e.g. when a cell transmission unit 3 has just consummated a change between a master indication and a slave indication, in conformity with a system switchover, for an incoming cell of each path (a VCI/VPI) currently established.

Described below with reference to drawings is an embodiment of this invention operating under the above principle.

Figure 2:
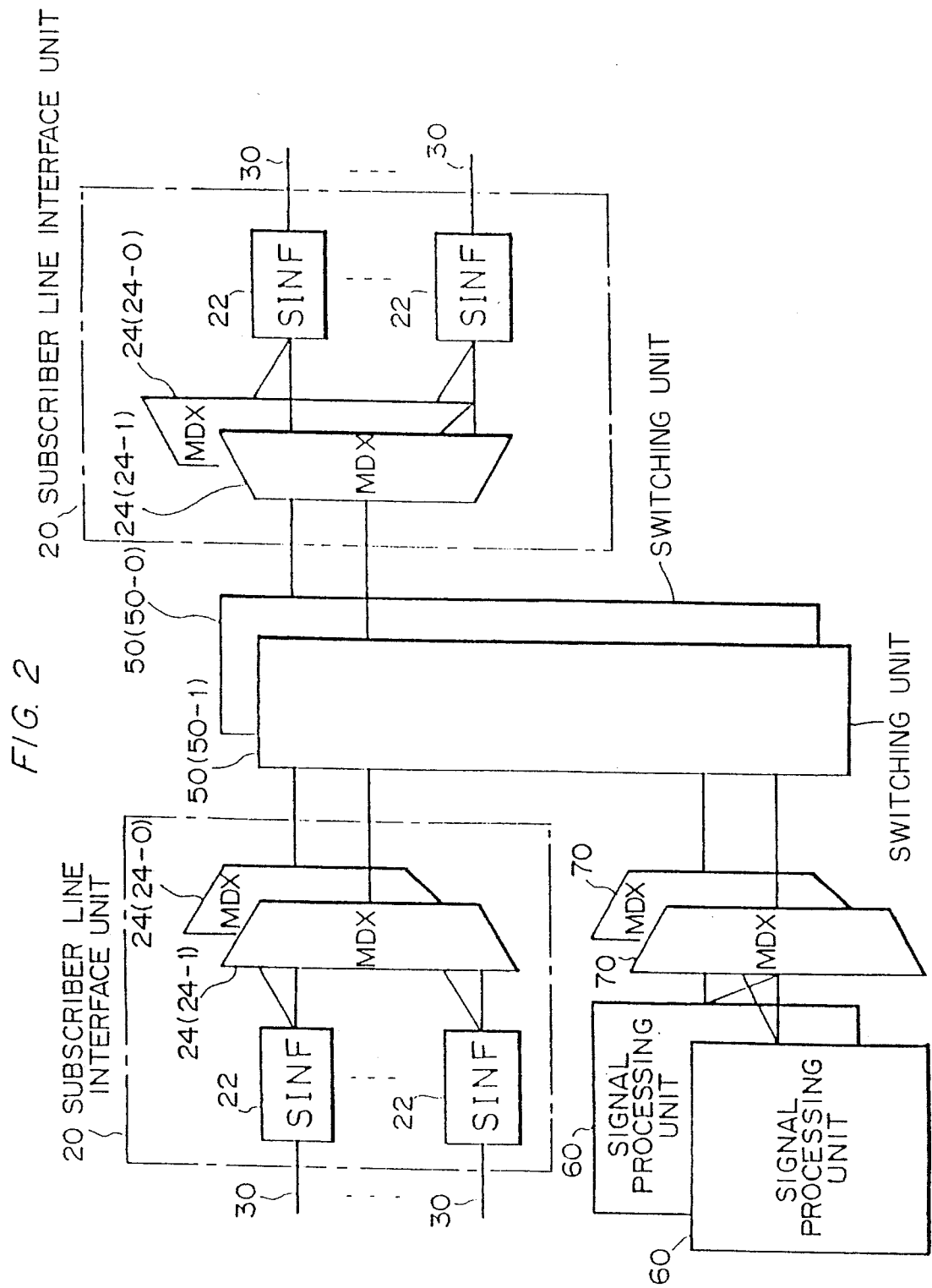
FIG. 2 is a block diagram illustrating the system configuration of an ATM exchange according to an embodiment of this invention.

FIG. 2 is a block diagram showing the global system configuration of an ATM exchange pursuant to an embodiment of this invention.

In FIG. 2, a subscriber line interface unit 20 comprises an SINF (subscriber interface) 22 interfacing with a subscriber line 30, and an MDX (Multiplexer/Demultiplexer) 24 interfacing with a switching unit 50.

An SINF 22 interfaces with a subscriber line 30 for a cell synchronization.

An MDX 24 operates as a multiplexer for multiplexing cells supplied from a plurality of SINF's 22 for an aggregation to a switching unit 50 and as a demultiplexer for demultiplexing cells supplied from the switching units 50 for a distribution to their appropriate SINF's 22. The MDX 24 also operates as a VCC (Virtual Channel Converter) for setting a path in a switching unit 50, in addition to operating as a multiplexer for multiplexing cells.

The switching units 50 are duplexed with 50-0 for system #0 and 50-1 for system #1, one operating as a master and the other operating as a slave at all times. A system switchover switches over a slave with a master.

A signal processing unit 60 is a subsystem for processing e.g. signal data on a call that a subscriber supplies by signaling. The signal processing units 60 also having a duplex structure are connected to the switching units 50 via likewise duplexed MDX's 70, respectively.

Although the signal processing units 60 are duplexed against each of the switching units 50, the subscriber line interface units 20 are not completely duplexed. That is, although the MDX's 24 are duplexed with MDX's 24-0 and 24-1 respectively for switching unit 50-0 for system #0 and switching unit 50-1 for system #1, SINF's 22 are not duplexed. Hence, unless a cell is duplicated or lost between the switching units 50 and the subscriber line interface unit 20 not completely duplexed for the switching units 50, it becomes possible to switchover systems without an interruption, upon a system switchover of the duplexed switching units 50.

Figure 3:
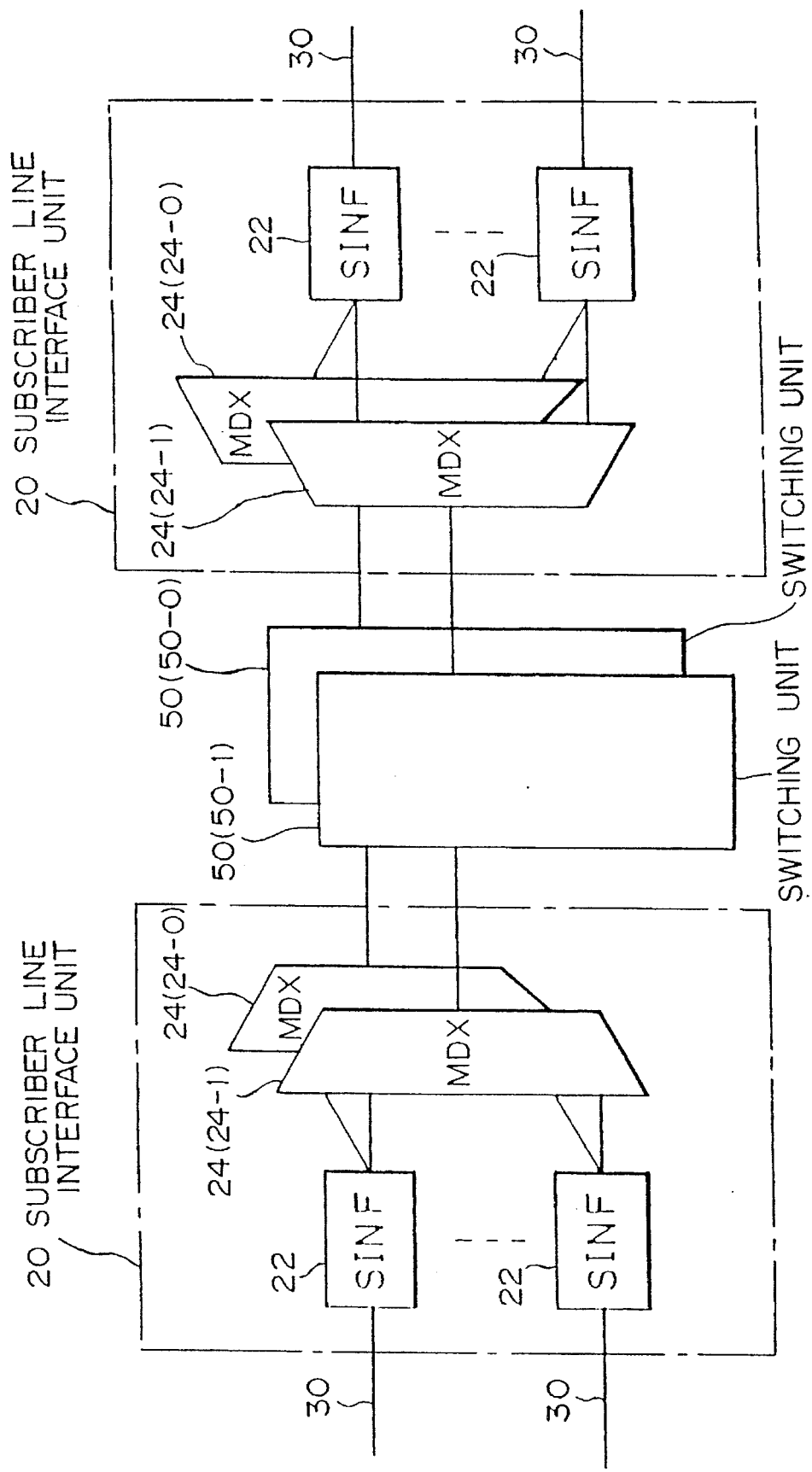
FIG. 3 is a diagram drawn by extracting the pertinent part of the invention from FIG. 2.

FIG. 3 shows a pertinent part related to this invention extracted from the global configuration of an ATM exchange shown in FIG. 2. More specifically, FIG. 3 shows the configuration of a device comprising the duplexed switching units 50 (50-1 and 50-2) and the subscriber line interface unit 20 not completely duplexed for the switching units 50.

Assuming the configuration shown in FIG. 3, following reasons exist for the occurrence of a cell duplication or a cell loss, upon a system switchover:

(1) Since each of the switching units 50-0 and 50-1 respectively for the duplexed systems #0 and #1 operates asynchronously as against each other, even if identical paths are set in the switching units 50-0 and 50-1, both systems have a difference in the amount of time it takes for a cell to travel from an SINF 22 on the cell transmission side (on the side of receiving a cell from a subscriber line 30) to an SINF 22 on the cell reception side (on the side of transmitting a cell to a subscriber line 30).

(2) An SINF 22 on the cell reception side receives a cell each from a plurality of SINF's 22 on the cell transmission side. Hence, both systems have a difference in the amount of time it takes for a cell to travel from each of the plurality of SINF's 22 on the cell transmission side to an SINF 22 on the cell reception side.

Thus, an SINF 22 on the cell reception side does not receive a cell from system #0 and a cell from system #1 at the same timing, but it receives them at a different timing. Hence, a system switchover without an interruption with neither a cell duplication nor a cell loss requires a change of paths currently set for respective calls from an old master to a new master on a call-by-call basis.

Figure 4:
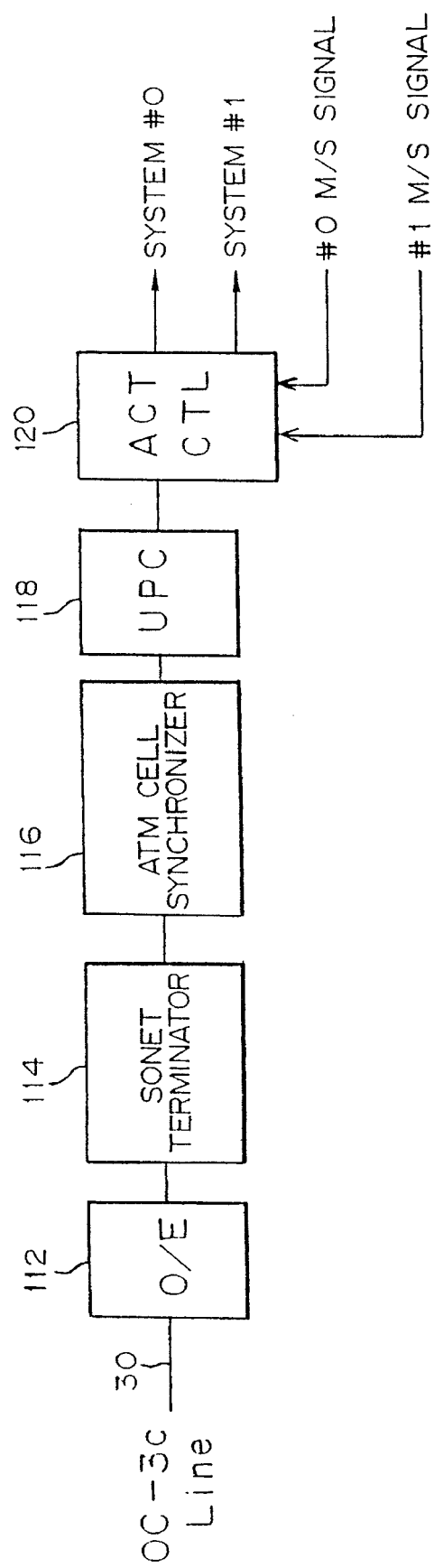
FIG. 4 is a diagram showing the transmission side circuit of an SINF.
Figure 5A:
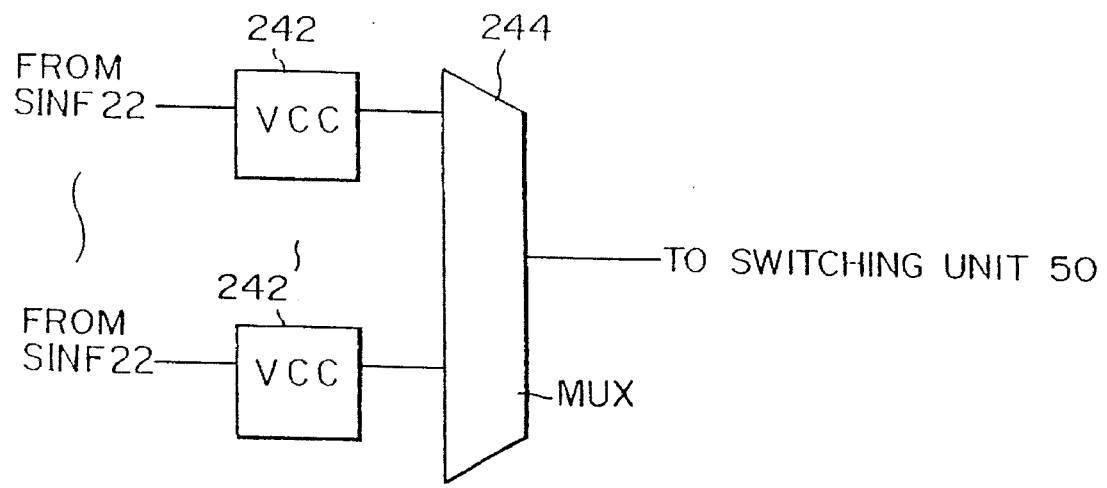
FIGS. 5(a)–(b) are a diagram showing the circuit configurations of a MUX unit of an MDX.
Figure 5B:
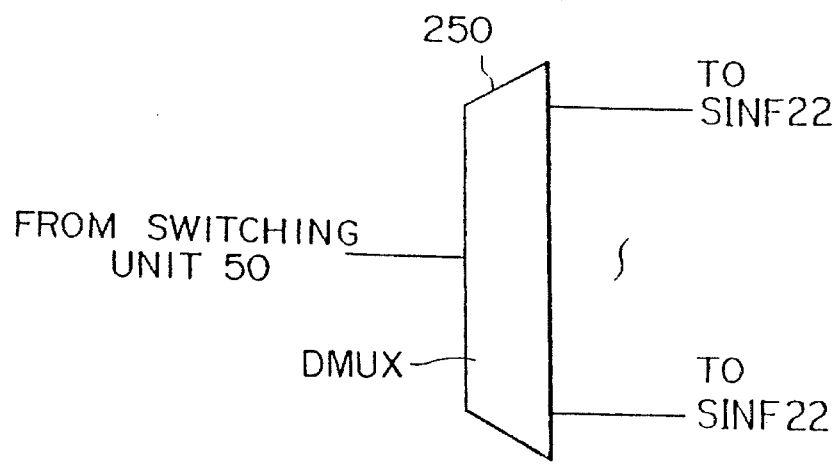
Figure 6:
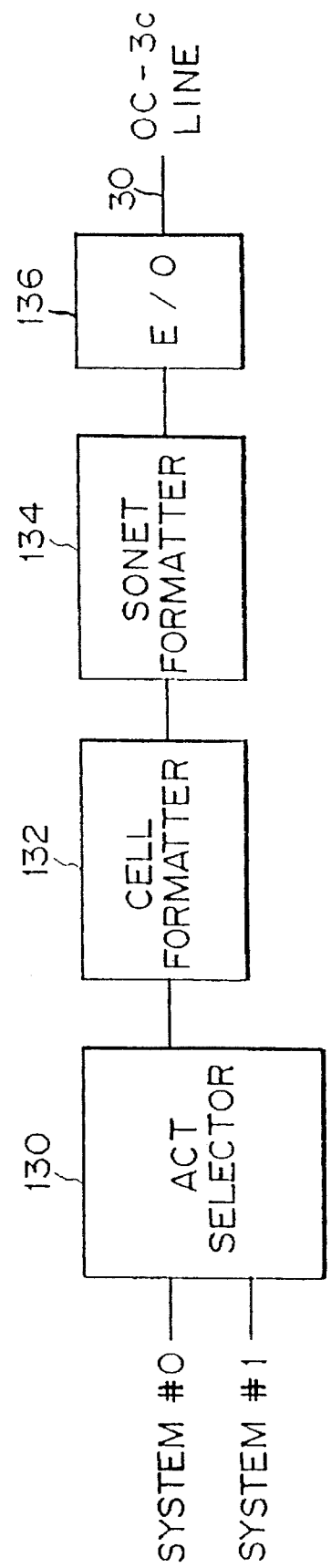
FIG. 6 is a diagram showing the reception side circuit of an SINF.

FIGS. 4 through 6 show the circuit configurations of SINF 22 and MDX 24 for realizing such a system switchover without an interruption.

SINF 22 contains a transmission side circuit shown in FIG. 4 and a reception side circuit shown in FIG. 6.

FIG. 4 is a diagram showing the configuration of a cell transmission side circuit of SINF 22.

An O/E (opto-electrical converter) 112 converts into an electrical signal an optical signal transmitted in a SONET (synchronous optical network) format from a subscriber line (OC-3c line) 30 comprising optical fiber cables.

SONET referred to herein is an SDH (synchronous digital hierarchy) for optical communications proposed by the Bellcore (Bell Communications Research Center) in the United States. It matches an international standard interface advised by the CCITT.

Also, the OC(optical circuit)-3c line is a subscriber line made of an optical fiber cable based on a SONET format. It provides communications services at a transmission speed of 155.52 Mb/s [megabits per second] using SONET STS-3 frames.

A SONET terminator 114 digitizes an electrical signal supplied from the O/E 112 into binary data comprising "0" and "1" for a SONET synchronization.

Figure 7:
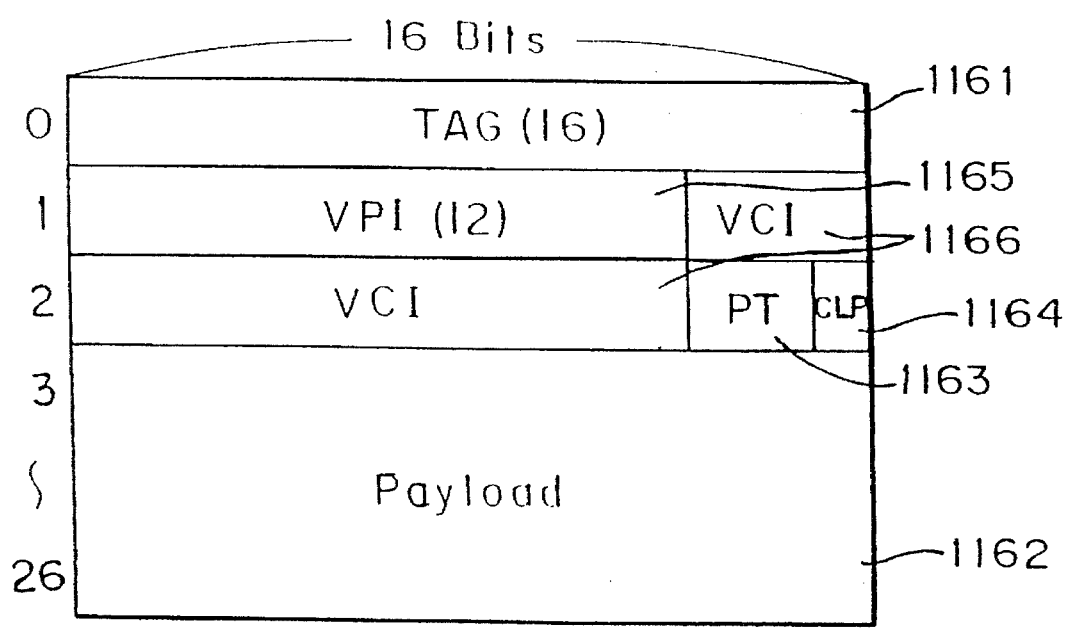
FIG. 7 is a diagram showing the format of a cell generated by an ATM cell synchronizer.

An ATM cell synchronizer 116 synchronizes the cells from digital data bit columns supplied serially from the SONET terminator 114 for a conversion into a format composed of fifty-four [54] bytes (octets) shown in FIG. 7.

An UPC (Usage Parameter Controller) 118 oversees whether the nominal value of a transmission capacity quoted by a subscriber matches the actual value of the cell flows in. Upon detecting a violation, the UPC 118 executes a control for protecting network resources e.g. by discarding cells.

An ACT CTL (ACT controller) 120 transmits a cell supplied via the UPC 118 to MDX 24 of the active side (hereafter expressed as the master side) system by setting to "1" an M/S bit in its tag, and such a cell to MDX 24 of the backup side (hereafter expressed as the slave side) system by setting to "0" an M/S bit in its tag.

FIGS. 5a and 5b show the circuit configurations of a MUX (multiplexing) unit 240 and a DMUX (demultiplexing) unit 250, respectively, forming MDX's 24 (24-0 and 24-1).

A MUX unit 240 is a circuit operating as a multiplexer as described above. It comprises a VCC (virtual channel converter) 242 provided individually for each SINF 22, and an MUX 244 connected to these plural VCC's 242.

The VCC 242 converts the VCI/VPI of a cell supplied from a corresponding SINF 22 connected on the cell transmission side to the VCI/VPI for the cell's routing on its output side, and assigns to the cell a tag representing the cell's path in the switching units 50. At this time, VCC 242 does not change the value of the M/S master/slave bit in the cell's tag. Hence, the M/S bit passes through a MUX unit 240 "as is".

The MUX 244 multiplexes cells supplied from the plural VCC's 242 for an output to an appropriate one of the switching units 50 for system #0 or #1.

The DMUX unit 250 distributes a cell supplied from the corresponding one of the switching units 50 to an appropriate SINF 22, pursuant to the cell's tag.

FIG. 6 is a diagram showing a circuit configuration on the cell reception side of SINF 22.

An ACT SEL (ACT selector) 130 receives a cell distributed from the DMUX unit 250 in each of MDX 24-0 for system #0 and MDX 24-1 for system #1, respectively, and selectively outputs to a cell formatter 132 a cell whose M/S bit has a master indication, i.e. only a cell exchanged by one of the switching units 50 currently operating as a master.

The cell formatter 132 reformats a supplied cell into a line format for a subscriber line 30.

A SONET formatter 134 outputs to an E/O (elelctro-optical converter) 136 a cell in the line format supplied from the cell formatter 132 by mapping the cell to the SONET format with a SOH (section overhead) and a POH (path overhead) added.

The E/O 136 converts a supplied electrical signal to an optical signal for an output to the subscriber line (OC-3c line) 30.

FIG. 7 shows a format of the cell generated by the ATM CELL synchronizer 116 in a circuit on the cell reception side of SINF 22 shown in FIG. 4.

In FIG. 7, VCC 242 sets in a tag 1161 in a zeroth [0th] word routing data specifying the path of a cell in a switching unit 50. As well, the tag 1161 includes an M/S bit, (not shown) a mark designating whether the cell is to be supplied to a system on the master side or to a system on the slave side. As described above, the ACT CTL 120 sets a value in the M/S bit.

A payload 1162 occupying third [3rd] word through twenty-sixth [26th] word is one-hundred-and-ninety-two-bit [192-bit] data carrying user data or management data for use in an interoffice maintenance and operation.

A PT (payload type) 1163 is three-bit [3-bit] data designating whether the content of the payload 1162 represents user data or management data.

A CLP (cell loss priority) 1164 is a one-bit [1-bit] datum designating an importance in discarding the cell.

A VPI (virtual path identifier) 1165 is twelve-bit [12-bit] data designating a number for individually identifying a VP (virtual path), as described above.

A VCI (virtual channel identifier) 1166 is sixteen-bit [16-bit] data designating a number for individually identifying a VC (virtual channel), also as described above.

Figure 8:
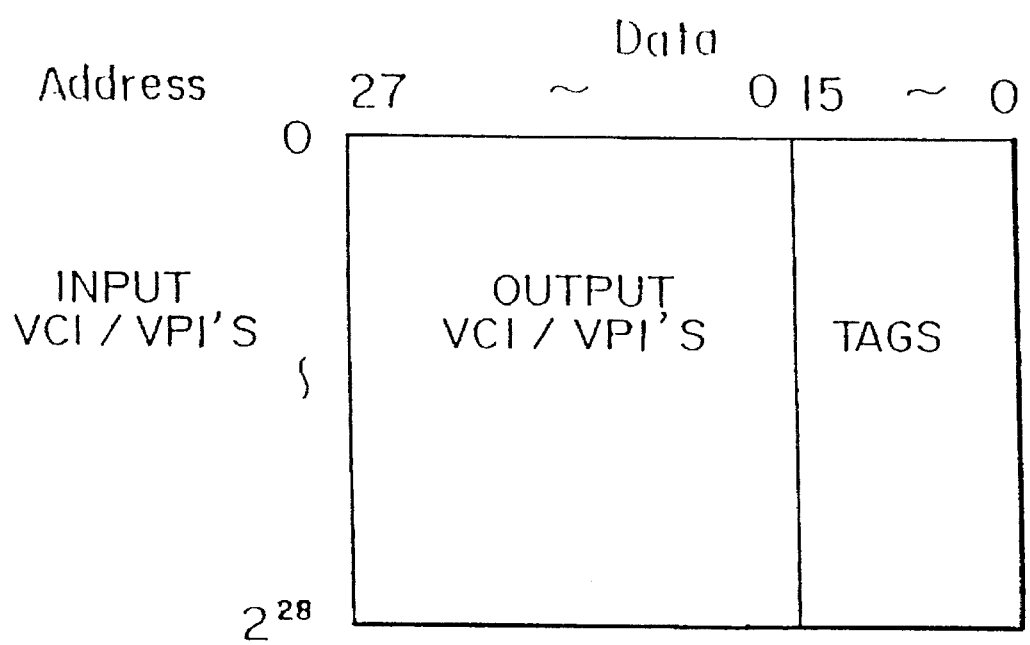
FIG. 8 is a diagram showing the configuration of a table, provided inside a VCC, for use in a VCI/VPI conversion and a replacement of a tag.

FIG. 8 shows a configuration of a VCI/VPI conversion table which is used by VCC 242 (shown in FIG. 5a) for converting a VCI/VPI and for setting a value to the tag 1161, whose art is publicly known.

A RAM (random access memory) may structure the VCI/VPI conversion table, for instance. VCC 242 supplies as an address signal to the RAM routing bits (a VCI/VPI) comprising twenty-eight [28] bits in an incoming cell, thereby reading out from a corresponding address twenty-eight [28] bits of a VCI/VPI on the output side and eight sixteen [16] bits of tag, thus converting the VCI/VPI and setting a value to the tag 1161.

A call processor (CPR, not shown) may write the content of the VCI/VPI conversion table, for instance.

Figure 9:
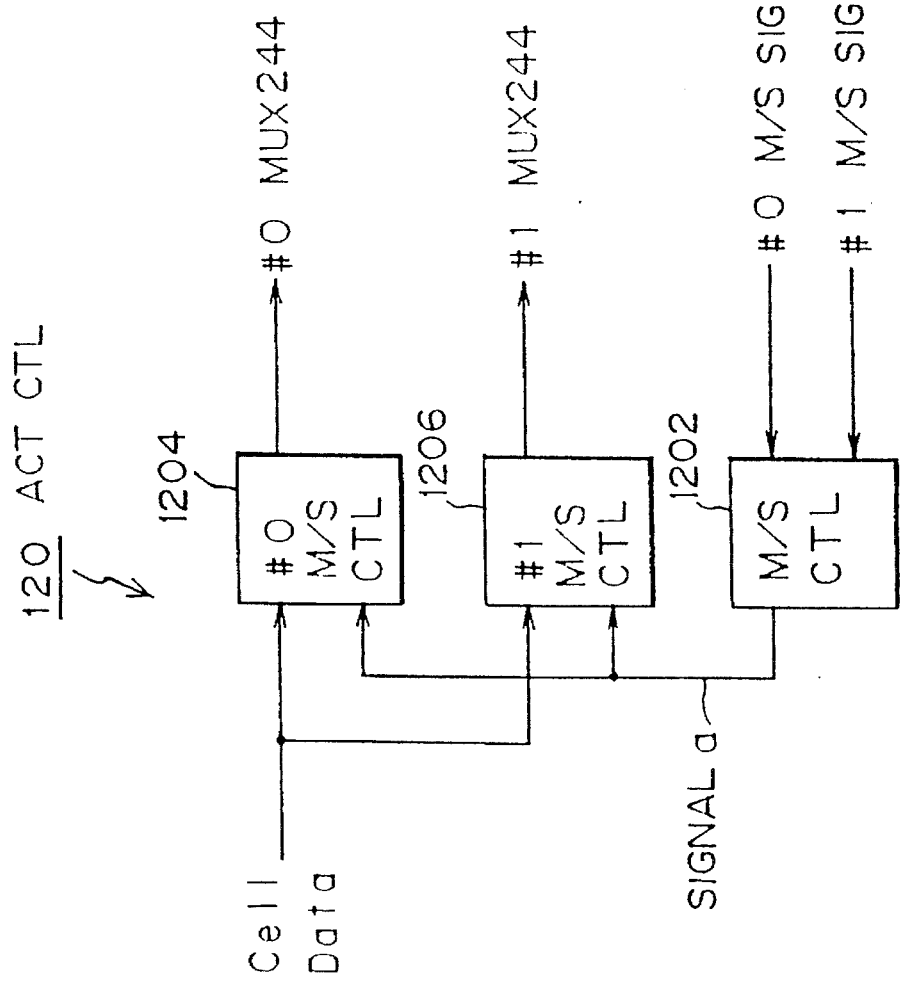
FIG. 9 This is a diagram showing the circuit configuration of an ACT CTL.

FIG. 9 is a diagram showing an example of a circuit configuration of the ACT CTL 120.

In FIG. 9, an M/S CTL (Master/Slave Controller) 1202 receives a #0 M/S signal and a #1 M/S signal respectively from switching unit 50-0 for system #0 and switching unit 50-1 for system #1. The #0 M/S signal and the #1 M/S signal are notification signals informing the ACT CTL 120 of the current operating modes (i.e. as a master or as a slave) of the switching units 50-0 and 50-1, respectively, by designating "1" for a master and "0" for a slave. Upon receiving a mutually independent instruction for a system switchover from respective controllers (not shown), switching unit 50-0 for system #0 and switching unit 50-1 for system #1 set and output the #0 M/S signal and the #1 M/S signal.

The M/S CTL 1202 operates pursuant to the #0 M/S signal and the #1 M/S signal as shown in Table 1 below.

TABLE 1

| #0 M/S | #1 M/S | *MODUS OPERANDI* (OPERATING MODES) |
|---|---|---|
| 0 | 0 | KEEPING CURRENT OPERATING MODES |
| 1 | 0 | SYSTEM SWITCH-OVER FROM #1 TO #0 |
| 0 | 1 | SYSTEM SWITCH-OVER FROM #0 TO #1 |
| 1 | 1 | KEEPING CURRENT OPERATING MODES |

That is, because switching unit 50-0 for system #0 and switching unit 50-1 for system #1 are independently controlled to operate as a master or as a slave, even upon a system switchover, the #0 M/S signal and #1 M/S signal do not change synchronously. Therefore, the #0 M/S signal and #1 M/S signal can have the same value (both "0" or both "1") at the same time. After having the same value designating the same operating mode, the #0 M/S signal and #1 M/S signal have different values designating different operating modes.

The M/S CTL 1202 detects that a master has changed from system #1 to system #0, when both the #0 M/S signal has changed its value from "0" to "1" and the #1 M/S signal has changed its value from "1" to "0". In this case, the M/S CTL 1202 notifies, by a signal a, the #0 M/S CTL 1204 of the effect that system #0 is a master and the #1 M/S CTL 1206 of the effect that system #1 is a slave.

Conversely, the M/S CTL 1202 detects that a master has changed from system #0 to system #1, when both the #0 M/S signal has changed its value from "1" to "0" and the #1 M/S signal has changed its value from "0" to "1". In this case, the M/S CTL 1202 notifies, by a signal a, the #0 M/S CTL 1204 of the effect that system #0 is a slave and the #1 M/S CTL 1206 of the effect that system #1 is a master.

The #0 M/S CTL 1204 sets, pursuant to a signal a supplied from the M/S CTL 1202, to the M/S bit in the tag 1161 of a cell supplied from the UPC 118 "1" (upon informed of the effect that system #0 is a master) and "0" (upon informed of the effect that system #0 is a slave), and supplies the cell to the MUX 244 for system #0.

As well, the #1 M/S CTL 1206 operates on the MUX 244 for system #1, pursuant to a signal a, in a manner similar to the #0 M/S CTL 1204.

Figure 10:
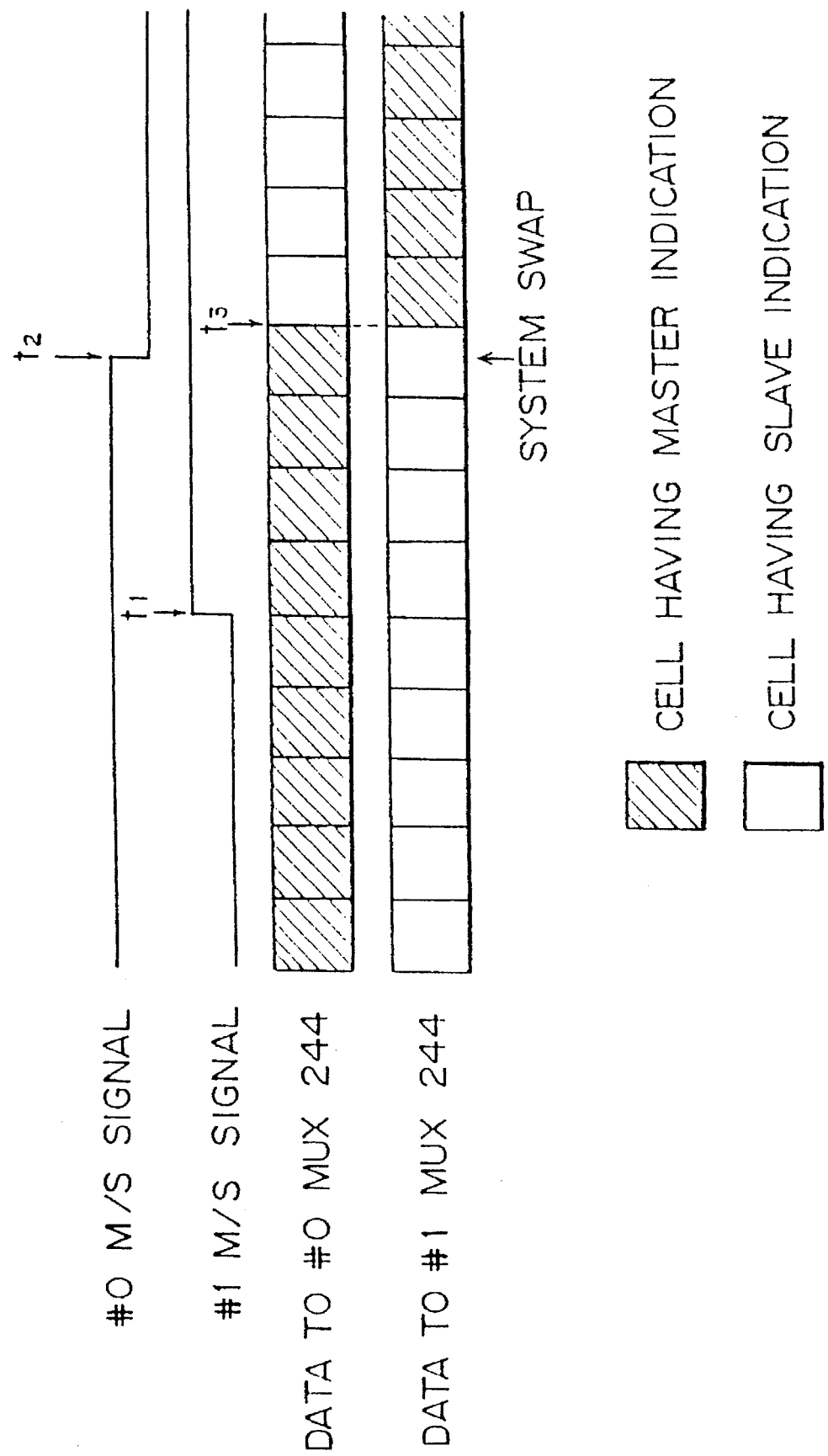
FIG. 10 is a timing chart showing the operation of the ACT CTL.

FIG. 10 is a timing chart illustrating the operation of the ACT CTL 120.

In FIG. 10, until a timing t1, switching unit 50-0 for system #0 operates as a master, while switching unit 50-1 for system #1 operates as a slave. Thus, as shown in FIG. 10, until timing t1, the M/S CTL 1202 receives the #0 M/S signal supplied from switching unit 50-0 whose value is set to "1" and the #1 M/S signal supplied from switching unit 50-1 whose value is set to "0".

Then, at timing t1, switching unit 50-1 for system #1 receives an instruction to change its operating mode from a slave to a master, and as shown in FIG. 10, switching unit 50-1 for system #1 changes the #1 M/S signal from "0" to "1". Next, after a delay of slots for not less than three [3] cells, at a timing t2, switching unit 50-0 for system #0 receives an instruction to change its operating mode from a master to a slave, and as shown in FIG. 10, switching unit 50-0 for system #0 changes the #0 M/S signal from "1" to "0". The M/S CTL 1202 detects by a change of the #0 M/S signal a system switchover in which a master mode moves from #0 system to #1 system, and outputs to #0 M/S CTL 1204 a signal a instructing a slave indication and to #1 M/S CTL 1206 a signal a instructing a master indication.

As shown in FIG. 10, upon receiving a signal a, the #0 M/S CTL 1204 begins changing the M/S bit of a cell, starting from a first cell supplied after timing t2, to have a slave indication for an output to the MUX 244 for system #0. Also, as shown in FIG. 10, upon receiving a signal a, the #1 M/S CTL 1206 begins changing the M/S bit of a cell, starting from a first cell supplied after timing t2, to have a master indication for an output to the MUX 244 for system #1.

Thus, a system switchover substantially takes place at timing t3 as shown in FIG. 10.

Figure 11:
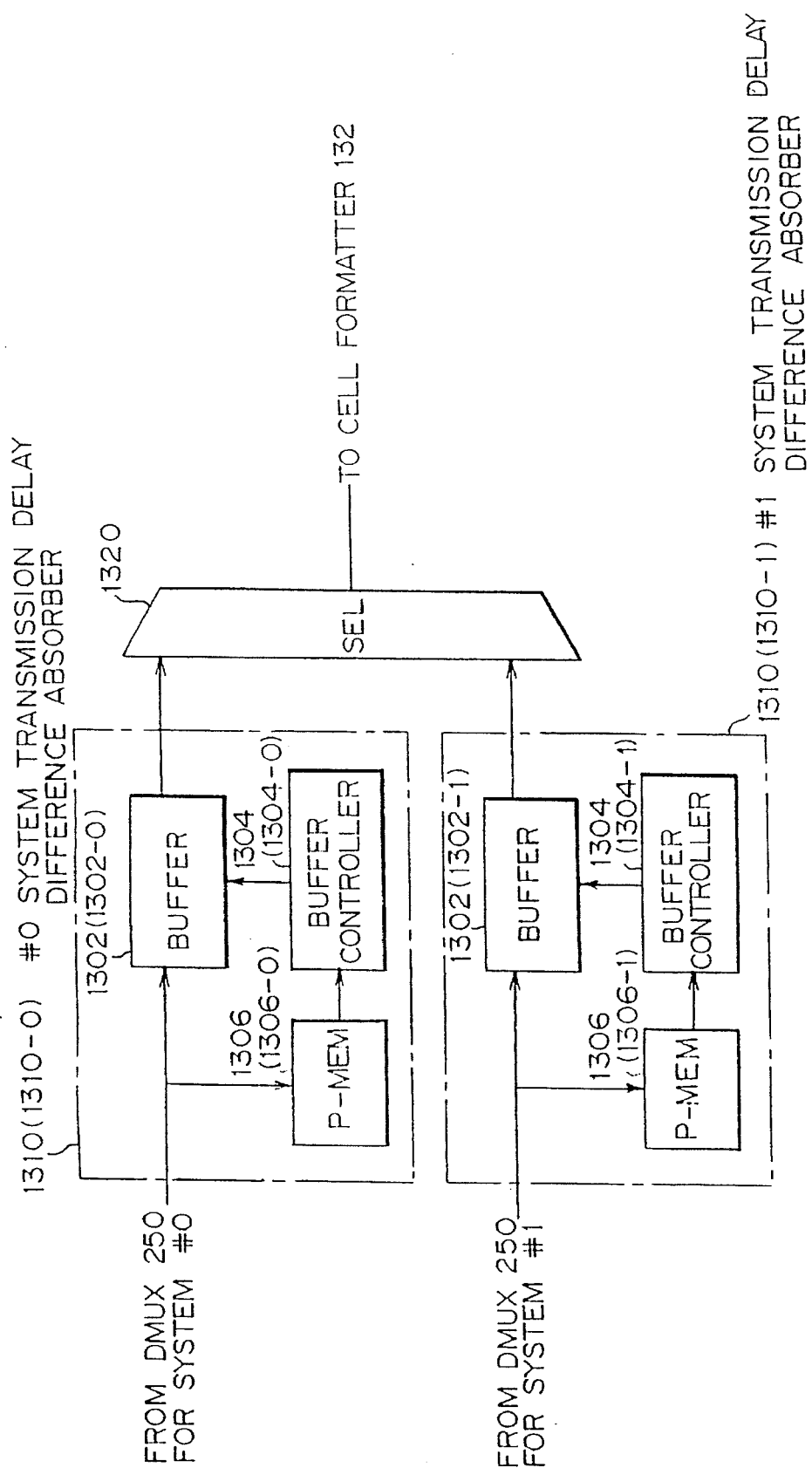
FIG. 11 is a diagram showing a circuit configuration of the ACT SEL.

FIG. 11 is a diagram illustrating an example of a circuit configuration of the ACT SEL 130.

In FIG. 11, each of no-interruption switching-over transmission delay difference absorbers 1310 (hereafter expressed simply as transmission delay difference absorbers 1310) duplexed for both systems #0 and #1 comprises a buffer 1302, a buffer controller 1304 and a P-MEM (path memory) 1306.

The buffer 1302 is an output buffer for temporarily absorbing the transmission delay difference between system #0 and system #1. Its buffer capacity is set e.g. by taking into consideration the transmission delay difference between both systems.

Figure 12:
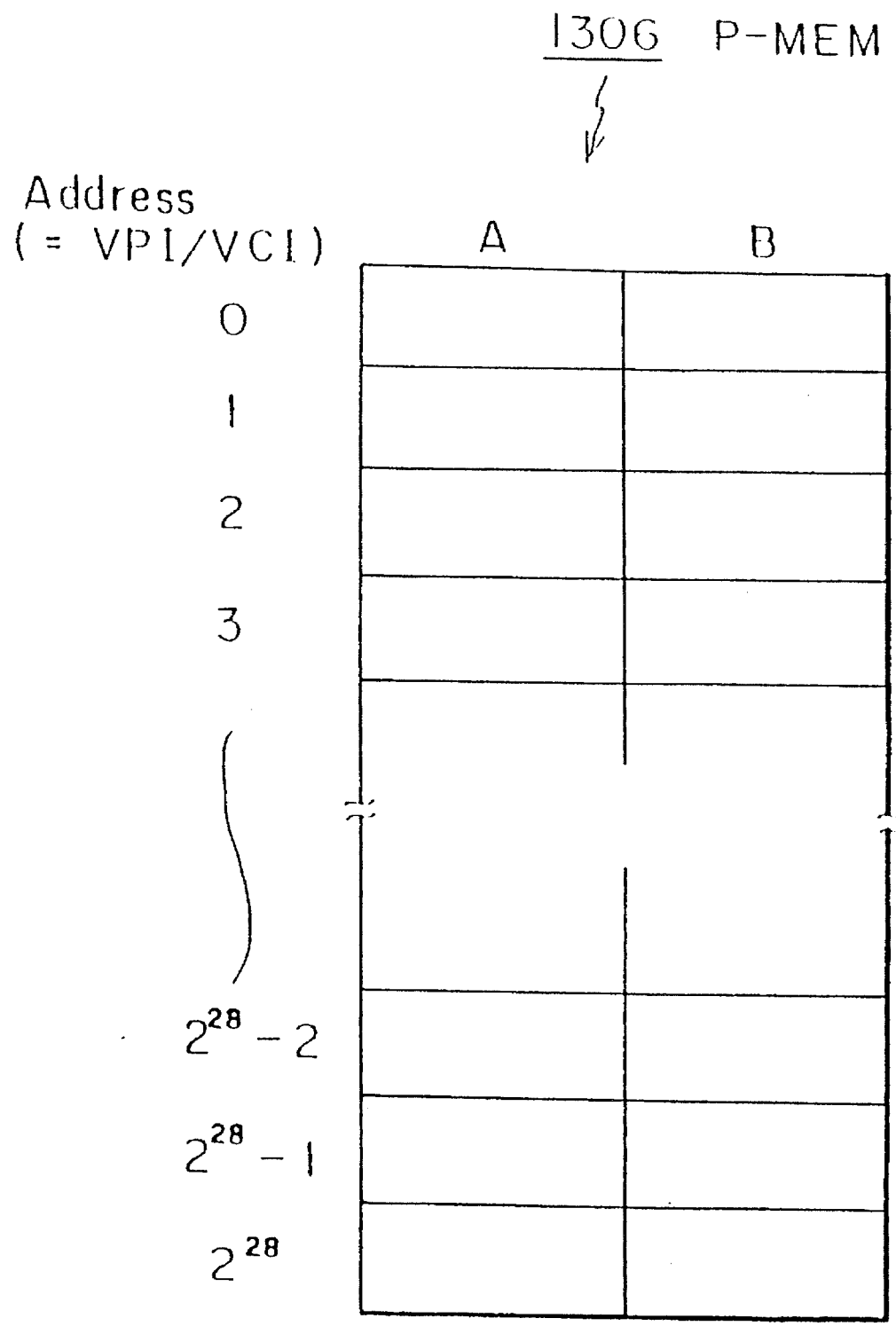
FIG. 12 is a diagram showing an internal structure of a P-MEM.

As shown in FIG. 12, P-MEM 1306 has its address correspond to a VCI/VPI of a path set individually for each call, and each address stores 2-bit [two-bit] data comprising an A bit and a B bit.

The A bit specifies a VCI/VPI of a path currently used by a subscriber for communications. Its value is set to "1", when in use.

As will be later described in detail, the B bit controls a system switchover. Its value is reset to "0", upon detecting a system switchover. Also, when the call processor (not shown) described earlier establishes a path in a VC connection through software processing, it sets to "1" the value of the A bit. And when the call processor releases the VC connection, it resets to "0" the value of A bit.

That is, upon establishing a path in a VC connection, the call processor sets to "1" the A bit of data addressed by VCI/VPI assigned to the path. Upon releasing a VC connection, the call processor resets to "0" the A bit according to the above described addressing.

When a path is established and released in the VC connection, the A bit is set and reset by a microprocessor (not shown) provided in the ACT SEL 130 at the instruction of the call processor. The microprocessor also resets the B bit upon detecting a system switchover at the instruction of the call processor. Since the microprocessor can be performing another process when a system switchover is detected, an address counter (not shown) can be provided separately in the P-MEM 1306. The address counter sequentially outputs address signals to the P-MEM 1306 starting with signal "0" at the instruction of the microprocessor. At this time, a selector (not shown) is provided to select and output to the P-MEM 1306 either of the address signals outputted by the address counter or the micro-processor at the instruction of the microprocessor.

The buffer controller 1304 reads out a cell having a master indication written in a buffer 1302 (described above) for an output to a selector 1320, by referring to contents of the P-MEM's 1306.

Pursuant to a selection signal supplied from a controller (not shown), the selector 1320 selectively outputs to cell formatter 132 in SINF 22 a cell having master indication read out either from a buffer 1302-0 in a #0 system transmission delay difference absorber 1310-0 or from a buffer 1302-1 in a #1 system transmission delay difference absorber 1310-1.

Explained next are actions of a pertinent part related to the embodiment of this invention having the above configuration.

Described first are its actions when a subscriber originates a call.

A subscriber originates a call by a signaling. Upon receiving the signaling, a call processor (not shown) assigns a VCI/VPI for use in communications by the subscriber. At this time, the call processor sets a path (a VCI/VPI on the output side and a tag) corresponding to the VCI/VPI assigned to the subscriber in the VCI/VPI conversion table shown in FIG. 8.

Further, the call processor has the ACT SEL 130 set to "1" the A bit of data addressed by the VCI/VPI of the established path in one of the P-MEM 1306's. The call processor performs the above actions on both systems through software processing.

Accordingly, pursuant to a call origination by a signaling from a subscriber, paths for use in communications by the subscriber are established similarly in the VCI/VPI conversion tables respectively in VCC's 242 in the MUX units 244 of MDX 24-0 for system #0 and MDX 24-1 for system #1; and the microprocessor has the ACT SEL 130 set to "1" the A bits of the VCI/VPI's of the established paths in a P-MEM 1306-0 for system #0 and a P-MEM 1306-1 for system #1. As a result, the A bits in P-MEM 1306-0 for system #0 and the A bits in P-MEM 1306-1 for system #1 have the same value.

Described second are its actions upon a system switchover during system operations.

Upon a system switchover, outputted through the call processor (not shown), etc. are signals instructing a system switchover to switching unit 50-0 for system #0 and switching unit 50-1 for system #1. Upon receiving a signal instructing a system switchover, switching unit 50-0 for system #0 recognizes whether it begins operating as a master or as a slave, and outputs to the ACT CTL 120 in each SINF 22 the #0 M/S signal, which is an ACT signal designating its new operating mode (a master mode or a slave mode) after the system switchover. As well, switching unit 50-1 for system #1 similarly outputs the #1 M/S signal to the ACT CTL 120 in each SINF 22.

As described above, because respective controllers (not shown) independently control switching unit 50-0 for system #0 and switching unit 50-1 for system #1, the #0 M/S signal and the #1 M/S signal do not necessarily change concurrently, as shown in FIG. 10. As shown in Table 1 described earlier, the ACT CTL 120 detects a system switchover only after detecting that both the #0 M/S signal and the #1 M/S signal have changed. Thereafter, the ACT CTL 120 sets to "1" (a master indication) the M/S bit in the tag 1161 of a cell supplied to MDX 24 of the system changed from a slave to a master, and "0" (a slave indication) to the M/S bit in the tag 1161 of a cell supplied to MDX 24 of the system changed from a master to a slave.

By using the VCI/VPI conversion table shown in FIG. 8, VCC 242 of MDX 24-0 for system #0 and VCC 242 of MDX 24-1 for system #1 convert an input VCI/VPI of a supplied cell to an output VCI/VPI and sets in the tag 1161 paths in switching unit 50-0 and 50-1. At this time, the M/S bit in the tag 1161 does not change. After similarly processing supplied cells, MDX 24-0 for system #0 and MDX 24-1 for system #1 output the cells to the appropriate ones of the switching units 50-0 and 50-1.

Pursuant to routing data set in the tag 1161 of a supplied cell, each of switching unit 50-0 for system #0 and switching unit 50-1 for system #1 exchanges the cell and outputs it to the appropriate one of MDX 24-0 and MDX 24-1 in the subscriber line interface unit 20.

The DMUX unit 250 in each of MDX 24-0 for system #0 and MDX 24-1 for system #1 distributes to an appropriate SINF 22 a supplied cell in accordance with its tag 1161.

Because both systems operate their respective MDX's 24 and switching units 50 asynchronously, an SINF 22 asynchronously receives identical (excepting their M/S bits) cells from DMUX 250 for system #0 and DMUX 250 for system #1. Therefore, the ACT SEL 130 shown in FIG. 11 has a #0 system transmission delay difference absorber 130-0 and a #1 system transmission delay difference absorber 130-1 receive identical cells ordinarily with a timing difference. Hence, a simple reselection by the selector 1320 upon a system switchover causes a cell to be duplicated or lost.

Thus, this embodiment has it that a timing for a system switchover, i.e. a timing for reselecting a selective output from the selector 1320, is controlled by using P-MEM 1306-0 for system #0 and P-MEM 1306-1 for system #1.

First, upon detecting a system switchover, transmission delay difference absorber 1310-0 for system #0 and transmission delay difference absorber 1310-1 for system #1 reset to "0" all B bits in P-MEM 1306-0 for system #0 and P-MEM 1306-1 for system #1. As described above, because A bits in P-MEM 1306-0 for system #0 and P-MEM 1306-1 for system #1 store VCI/VPI data on paths currently used by a subscriber. That is, they set to "1" an A bit corresponding to a VCI/VPI currently in use.

Described below are operational steps of the system switchover when #0 system has operated as a master and #1 system has operated as a slave.

Upon detecting the system switchover, the ACT SEL 130 executes the following actions. First, under the control of the microprocessor, the ACT SEL 130 detects a cell whose M/S bit having a slave indication from among cells supplied from DMUX unit 250 for system #0, which has changed itself from a master to a slave. Also, the ACT SEL 130 detects a cell whose M/S bit having a master indication from among cells supplied from DMUX unit 250 for system #1, which has changed itself from a slave to a master. Then, system #0 and system #1 rewrite B bits in P-MEM 1306-0 for system #0 and P-MEM 1306-1 for system #1 from "0" to "1", and write only cells whose M/S bits having a master indication into buffer 1302-0 for system #0 and buffer 1302-1 for system #1.

In the meantime, the system which has changed itself from a master to a slave (#0 system) has its buffer controller 1304-0 keep reading a cell whose M/S bits having a master indication from its buffer 1302-0 for an output to the selector 1320. Meanwhile, the system which has changed itself from a slave to a master (#1 system) has its buffer controller 1304-1 only write and store a cell whose M/S bits having a master indication into its buffer 1302-1 without having a read-out therefrom.

In parallel with above operational steps, transmission delay difference absorber 1310-0 for system #0 and transmission delay difference absorber 1310-1 for system #1 act as follows:

As a first step, each of P-MEM 1306-0 for system #0 and P-MEM 1306-1 for system #1 performs an exclusive "or" operation between the A bit and the B bit for each VCI/VPI. As a second step, it obtains a logic sum of the results of all exclusive "or" operations performed in the first step. As a third step, if both P-MEM 1306-0 for system #0 and P-MEM 1306-1 for system #1 obtain "0" as their disjunctions in the second step, they have the selector 1320 reselect its output, thereby enabling a cell whose M/S bit having a master indication to be read from buffer 1302 for system #1, which changes from a slave to a master.

As descried above, each of P-MEM 1306-0 for system #0 and P-MEM 1306-1 for system #1 sets an address equivalent to a VCI/VPI assigned to a path, and sets to "1" the A bit of a VCI/VPI for a path currently in use.

More specifically, described for the ease of explanation is a case in which a system switchover such as one show in FIG. 10 arises.

Upon detecting a system switchover, in which a master changes from system #0 to system #1, by the #0 M/S signal from switching unit 50-0 for system #0 and the #1 M/S signal from switching unit 50-1 for system #1 at timing t2 shown in FIG. 10, each of P-MEM 1306-0 for system #0 and P-MEM 1306-1 for system #1 resets to "0" the B bit of each VCI/VPI. Hence, an exclusive "or" operation between the A bit and the B bit of a VCI/VPI with an established path must be "1". On the other hand, an exclusive "or" operation between the A bit and the B bit of a VCI/VPI without an established path must be "0", since the A bit of such a VCI/VPI is "0".

As described above, after resetting the B bits of all VCI/VPI's, the system changing from a master to a slave (system #0 ) detects a cell whose M/S bit having a slave indication, and rewrites from "0" to "1" the B bit of a VCI/VPI of such a detected cell. As well, the system changing from a slave to a master (system #1) detects a cell whose M/S bit having a master indication, and rewrites from "0" to "1" the B bit of a VCI/VPI of such a detected cell. Thus, the system changing from a master to a slave (system #0 ) can have "0" as an exclusive "or" operation between the A bit and the B bit of every VCI/VPI, only when all cells supplied over every path currently in use have changed their M/S bits from a master indication to a slave indication.

Because, as shown in FIG. 10, the ACT CTL 120 immediately changes from a master indication to a slave indication the M/S bit of a cell supplied to the system changing from a master to a slave (system #0), upon detecting a system switchover, the selector 1320 outputs to the cell formatter 132 every supplied cell whose M/S bit having a master indication, which the buffers 1302 store before detecting the system switchover, at the time when the above exclusive "or" operation is "0".

Meanwhile, in a manner similar to the above, in the system changing from a slave to a master (system #1), when a cell supplied over every path currently in use changes its M/S bit from a slave indication to a master indication, the exclusive "or" operation between the A bit and the B bit of every VCI/VPI is "0". Hence, at this time, buffer 1302-1 for system #1 stores each cell whose M/S bit having a master indication for every path after the system switchover, which have not been stored in buffer 1302-0 for system #0.

That is, the system changing from a slave to a master (system #1) stores in its buffer 1302-1 a cell whose M/S bit having a master indication e.g. after timing t3 shown in FIG. 10, and the system changing from a master to a slave (system #0) stores in its buffer 1302-0 a cell whose M/S bit having a master indication e.g. before timing t3. Consequently, buffer 1302-0 for system #0 and buffer 1302-1 for system #1 consecutively store cells whose M/S bits having a master indication. For this reason, the buffers 1302 for respective systems cannot store identical cells in duplication or lose any cell.

Furthermore, the system changing from a master to a slave (system #1) and the system changing from a slave to a master (system #0) can have their P-MEM's 1306 (1306-0 and 1306-1) obtain "0" as an exclusive "or" operation between the A bit and the B bit of every VCI/VPI, only when every path currently in use has changed its system switchover.

That is, at this time, transmission delay difference absorber 1310-0 of the system changing from a master to a slave (system #0) changes the M/S bit of its cell supplied over every path currently in use from a master indication to a slave indication. As well, transmission delay difference absorber 1310-1 of the system changing from a salve to a master (system #1) changes the M/S bit of its cell supplied over every path currently in use from a slave indication to a master indication.

Hence, a change of the one of the buffers 1302 from which a cell is read out, from buffer 1302-0 of a system operating as an old master (system #1), to buffer 1302-1 of a system operating as a new master (system #1), enables a system switchover without a cell duplication or loss for every path currently in use.

Likewise, upon a system switchover for changing system #0 from a slave to a master and system #1 from a master to a slave, such a change enables the system switchover without having a cell duplication or loss for every path currently in use.

Described below is an example of the above actions.

FIGS. 13A to 13H are diagram explaining actions upon a system switchover when two [2] paths a and b have been set. It shows an example in which switching unit 50-0 for system #0 changes from a master to a slave and switching unit 50-1 for system #1 changes from a slave to a master.

FIG. 13A is a timing chart of a cell, which DMUX unit 250 for system #0 supplies to transmission delay difference absorber 1310-0 for system #0. FIG. 13B is a timing chart of a cell, which DMUX unit 250 for system #1 supplies to transmission delay difference absorber 1310-1 for system #1. FIGS. 13A and 13B show a cell whose M/S bit having a master indication with slashes. Also, a suffix i (i=0,1,2) attached to cells a and b indicates the number designating the sequence of a cell in paths a and b, respectively. That is, path a sequentially transmits cells a0, a1, a2, . . . , and path b sequentially transmits cells b0, b1, b2, . . . .

Also, FIG. 13C shows the storage statuses of buffer 1306-0 for system #0 and buffer 1306-1 for system #1. Additionally, FIGS. 13D and 13E illustrate the statuses of the A bit and the B bit for paths a and b of P-MEM 1306-0 for system #0 and P-MEM 1306-1 for system #1. FIGS. 13A to 13H do not show the A bits other than those for path a and b, because they have values "0". FIGS. 13F and 13G are timing charts illustrating actions of buffer 1302-0 for system #0 and buffer 1302-1 for system #1, respectively. Finally, FIG. 13H is a timing chart illustrating a cell the selector (SEL) 1320 outputs over to an output highway.

(1) Upon receiving an instruction for a system switchover from respective call processors (not shown), both P-MEM 1306-0 for system #0 and P-MEM 1306-1 for system #1 reset to "0" all of their B bits under the control of the microprocessor or address counter, etc., as shown in FIGS. 13D and 13E. Also, as shown in FIG. 13G, buffer 1302-1 for system #1 operating as a new master suspends and stores its output. On the other hand, as shown in FIG. 13F, buffer 1302-0 for system #0 operating as a new slave continues its output.

(2) After the steps described in (1) have consummated, each of transmission delay difference absorber 1310-0 for system #0 and transmission delay difference absorber 1310-1 for system #1 receives a cell supplied from the ACT CTL 120 of an SINF 22 on the transmission side whose M/S bit has changed pursuant to the above instruction for a system switchover, as illustrated in timing charts shown as FIGS. 13A and 13B. As described above, since switching unit 50-0 for system #0 and switching unit 50-1 for system #1 act asynchronously, it takes a different amount of time for cells to travel, even over identical paths, from an SINF 22 on the transmission side to an SINF 22 on the reception side. Further, an SINF 22 on the reception side receives cells from a plurality of SINF's 22 on the transmission side. Hence, as shown in FIGS. 13A and 13B, transmission delay difference absorber 1310-0 for system #0 and transmission delay difference absorber 1310-1 for system #1 can receive cells in mutually different sequences. FIGS. 13A and 13B show an example in which the sequences of receiving cell a1 and cell b0 are different.

Furthermore, a cell transmitted by a sending SINF 22 before a switchover can reach a receiving SINF 22 later than a cell transmitted by another sending SINF 22 after the switchover. According to the example shown in FIG. 13A, a1 indicated as a slave reaches the receiving SINF 22 later than b0 indicated as a master.

(3) In a duration T1, system #0 receives cell a0 whose M/S bit having a master indication, (as shown in FIG. 13A,) and cell a0 is written into buffer 1302-0 for system #0 (as shown in FIG. 13C).

Meanwhile, during the same duration T1, system #1 receives cell a0 whose M/S bit having a slave indication. However, because the M/S bit of cell a0 has a slave indication, cell a0 is not written into buffer 1302-1 for system #1.

(4) In a next duration T2, because either system lacks an effective cell, (as shown in FIGS. 13A and 13B,) no cell is written into buffer 1302-0 for system #0 and buffer 1302-1 for system #1. Then, system #0 has buffer controller 1304-0 read out cell a0 whose M/S bit having a master indication, which the selector 1320 outputs to an output highway (as shown in FIGS. 13H).

(5) In a succeeding duration T3, system #0 receives cell a1 and system #1 receives cell b0 (as shown in FIGS. 13A and 13B). However, because the M/S bits of both cells have a slave indication, cells a1 and b0 are not written into buffer 1302-0 for system #0 and buffer 1302-1 for system #1. Also, at this time, transmission delay difference absorber 1310-0 for system #0 detects that cell a1 has a slave indication, and sets to "1" the B bit for a path a in P-MEM 1306-0 (as shown in FIG. 13D).

(6) In an ensuing duration T4, both systems #0 and #1 receive cells b0 and a1 whose M/S bits having a master indication, respectively. Because both systems #0 and #1 receive cells having a master indication, they write these supplied cells b0 and a1 into buffers 1302-0 and 1302-1, respectively (as shown in FIG. 13C). At this time, transmission delay difference absorber 1310-1 for system #1 detects that the M/S bit of cell a1 has a master indication, and sets the B bit for a path a of P-MEM 1306-1 (as shown in FIG. 13E).

(7) In a latter duration T5, system #0 receives cell b1 whose M/S bit having a slave indication, and system #1 receives cell b1 whose M/S bit having a master indication (as shown in FIGS. 13A and 13B). Thus, only cell b1 having a master indication is written into buffer 1302-1 for system #1 (as shown in FIG. 13C). As well in (6), buffer controller 1304-0 reads out cell b0 having been written into buffer 1302-0 for system #0, which the selector 1320 outputs to an output highway (as shown in FIG. 13H).

Furthermore, the transmission delay difference absorber 1310-0 for system #0 and transmission delay difference absorber 1310-1 for system #1 detect that the M/S bits of respective input cells b1 have a slave indication and a master indication, and sets to "1" the B bits for path b in the P-MEM's 1306-0 and 1306-1 (as shown in FIGS. 13D and 13E).

(8) Above processes in (7) cause P-MEM 1306-0 for system #0 and P-MEM 1306-1 for system #1 sets to "0" respective exclusive "or" operations between the A bit and the B bit for paths a and b currently established. This allows buffer controller 1304-1 of transmission delay difference absorber 1310-1 for system #1 to release the suspended output from buffer 1302-1 at the beginning of duration T6, thereby enabling buffer 1302-1 to output its content (as shown in FIG. 13G).

Also, a controller (not shown) in the ACT SEL 130 has the selector 1320 to reselect its output for selectively outputting to an output highway a cell supplied from buffer 1302-1 for system #1.

That is, M/S bits (mark designations) of input cells supplied to paths a and b of transmission delay difference absorber 1310-0 for system #0 and transmission delay difference absorber 1310-1 for system #1 in duration T5 have been changed to mark designations commensurate with a system switchover. Accordingly, in and after an upcoming duration T6, only transmission delay difference absorber 1310-1 for system #1 operating as a new master receives a cell whose M/S bit having a master indication over both paths a and b. The fact that the exclusive "or" operations of both paths a and b are "0" attests it.

(9) Within and after duration T6, the selector 1320 outputs to an output highway a cell read out from buffer 1302-1 for system #1. This allows cells a1 and b1 to be outputted to output highways in durations T6 and T7, respectively (as shown in FIG. 13H).

Then, in and after duration T6, buffer 1302-1 for system #1 sequentially stores supplied cells whose M/S bits having a master indication (as shown in FIG. 13C). Meanwhile, since transmission delay difference absorber 1310-0 for system #0 receives only a cell whose M/S bit having a slave indication in and after duration T6, buffer 1302-0 stores nothing in and after duration T6 (as shown in FIG. 13C).

In this manner, only transmission delay difference absorber 1310-1 for system #1 transmits a cell to an output highway in and after duration T6. That is, the system operating as a master changes from system #0 to system #1 in duration T6.

Here, the above system has it that the slowest path among paths the ACT SEL 130 on the reception side establishes in P-MEM's 1306 (the path over which a cell supplied after the detection of a system switchover whose M/S bit having a mark indication corresponding to the system switchover arrives last at the SINF 22 on the reception side) determines an amount of time required for a system switchover. Also, because a system switchover is executed upon receiving a new cell for every established path after detecting a change in the #0 M/S signal and the #1 M/S signal, which are notification signals informing the ACT CTL 120 of the current operating modes (i.e. as a master or as a slave) of the switching units 50-0 and 50-1, a PVC (permanent virtual channel) service cannot execute a system switchover, if there is a path having no data (cell) transmission.

To cope with such a case, the ACT SEL 130 may comprise for each system a plurality of buffers 1302 such as ones shown in FIG. 11. That is, in an extreme case, a buffer 1302 is provided for each VCI/VPI. Yet, since this will increase a hardware circuit size, buffers 1302 may be provided e.g. respectively for high seed paths, low speed paths and PVC's.

Although the above described embodiment explains an exchange and repeating of cells between a subscriber line 30 and another subscriber line 30, this invention can be applied without limitation to an exchange and repeating of cells between a subscriber line and a transmission line and between a transmission line and another transmission line.

As described above, this invention enables an ATM exchange transmitting cells between duplexed switching units operating asynchronously and a device not duplexed to be executed without having a cell to be duplicated or lost.

What is claimed is:

1. A redundant ATM (asynchronous transfer mode) exchange for communications between a plurality of input highways and a plurality of output highways, the exchange comprising:

a switching system #0 and a switching system #1 each having switching means operating in parallel with each other, one system being a master and another being a slave;

cell transmission means for each input highway, for receiving cells from a respective input highway and transmitting a copy of each received cell to each of the system #0 and system #1, for assigning a mark designating either a master indication or a slave indication to each cell received from said input highway, wherein a cell having the master indication is transmitted to the switching means operating as a master and a cell having the slave indication to the switching means operating as a slave; and cell reception means for each output highway, for receiving cells from the switching means of the system #0 and the switching means of the system #1 and transmitting one of said cells to a respective output highway based on said mark, for storing cells having the master indication after detecting at least one cell having said mark corresponding to a system switchover, for detecting that marks of said cells have changed to indicate said system switchover for each path currently set, and for switching-over between one system and another system without duplication and loss of cells by outputting the cells having the master indication stored in said cell reception means.

2. The redundant ATM exchange according to claim 1, wherein said cell reception means comprises:

memory means for storing bits indicating which path is set for each path and bits indicating whether the respective system should be a master or a slave for each path according to the mark of cells sent in each path, buffer means for storing cells having the master indication after detecting at least one cell having a mark corresponding to said system switchover, and detector means for detecting that upon said system switchover, the marks of cells transmitted from said cell transmission means have changed to designate said system switchover for each path currently set by calculating exclusive OR of a bit indicating which path is set for each path and a bit indicating whether the respective system should be a master or a slave for each path, which are stored in said memory means and calculating a logical sum of exclusive ORs for all paths currently set; and wherein the exchange further comprises switching-over means for switching-over a buffer means of one system from which a cell having said master indication is read with a buffer means of another system operating as a new master, according to said logical sum, to output the cells from said buffer means of said another system operating as a new master and conducting said system switchover without duplication and loss of cells.

3. The redundant ATM exchange according to claim 2, wherein said detector means comprises:

a storage means for storing data indicating whether or not a path is set for each logical channel identified by a virtual channel identifier and a virtual path identifier, and detecting that upon said system switchover, the mark of said cell transmitted from said cell transmission means has changed, for each path currently set, based on said data stored in said storage means.

4. The redundant ATM exchange according to claim 1, wherein:

each of said switching means of the system #0 and system #1, respectively, outputs a notification signal informing each of said cell reception means of the current operating mode of itself; and said cell reception means detects a system switchover by detecting a change in an input level of said notification signal.

* * * * *